US009941978B2

(12) United States Patent
Chen et al.

(10) Patent No.: US 9,941,978 B2
(45) Date of Patent: Apr. 10, 2018

(54) ACOUSTIC CHANNEL-BASED DATA COMMUNICATIONS METHOD

(71) Applicant: Jinghong Chen, Nanjing (CN)

(72) Inventors: Jinghong Chen, Nanjing (CN); Xiangning Chen, Nanjing (CN); Jingzhun Feng, Nanjing (CN)

(73) Assignee: SUZHOU REALPOWER ELECTRIC APPLIANCE CO., LTD, Suzhou (CN)

( * ) Notice: Subject to any disclaimer, the term of this patent is extended or adjusted under 35 U.S.C. 154(b) by 282 days.

(21) Appl. No.: 14/859,342

(22) Filed: Sep. 20, 2015

(65) Prior Publication Data

US 2016/0196825 A1 Jul. 7, 2016

(30) Foreign Application Priority Data

Apr. 14, 2015 (CN) ........................ 2015 1 01764939

(51) Int. Cl.

*G10L 19/00* (2013.01)
*H04B 11/00* (2006.01)
*G10L 21/00* (2013.01)

(52) U.S. Cl.

CPC .................................... *H04B 11/00* (2013.01)

(58) Field of Classification Search

CPC ..... G10L 19/002; G10L 19/005; G10L 19/06; G10L 19/10; H04B 11/00; H04B 21/2383
USPC ........................................ 704/501, 503, 504
See application file for complete search history.

(56) References Cited

U.S. PATENT DOCUMENTS

2013/0028335 A1* 1/2013 Limberg ............... H04L 1/0071 375/240.27
2016/0156406 A1* 6/2016 Frolov ............... H04B 7/18504 455/431

* cited by examiner

*Primary Examiner* — Thierry L Pham
(74) *Attorney, Agent, or Firm* — CBM Patent Consulting, LLC

(57) ABSTRACT

It discloses an acoustic channel-based data communications method which performs channel coding on an original data signal using a CRC coding method and a BCH coding method to obtain a coded sequence; modulates the coded sequence using a preset audio sequence symbol set via a symbol mapping method to obtain a digital audio signal; selects a channel frequency band according to characteristics of a transmitting equipment and interference between frequency bands; and converts the digital audio signal into an analog audio signal through a digital-to-analog converter and transmits the signal to a channel for transmission according to the selected channel frequency band.

4 Claims, 5 Drawing Sheets

Perform channel coding on an original data signal using a CRC coding method and a BCH coding method to obtain a coded sequence — S301

Modulate the coded sequence using a preset audio sequence symbol set via a symbol mapping method to obtain a digital audio signal — S302

Select a channel frequency band according to characteristics of a transmitting equipment and interference between frequency bands — S303

Convert the digital audio signal into an analog audio signal through a digital-to-analog converter and transmit the signal to a channel for transmission according to the selected channel frequency band — S304

Receive the analog audio signal transmitted in the channel and convert the analog audio signal into a digital audio signal through an analog-to-digital converter — S305

Eliminate strong interference channel frequency band data from the digital audio signal by calculating the cross-correlation between the digital audio signal having a frequency within the range of each channel frequency band and an original sample signal — S306

Capture a synchronization symbol by calculating the cross-correlation between a synchronization symbol sample and the digital audio signal with strong interference channel frequency band data eliminated, and perform symbol inverse mapping, thus completing signal modulation and obtaining a digital sequence — S307

Perform channel decoding on the digital sequence using a CRC decoding method and a BCH decoding method to obtain the original data signal — S308

ACOUSTIC CHANNEL-BASED DATA COMMUNICATIONS METHOD

This application claims priority to Chinese Patent Application Ser. No. 2015101764939 filed 14 Apr. 2015.

TECHNICAL FIELD

The present invention relates to the field of communications technology, and more particularly, to an acoustic channel-based data communications method.

BACKGROUND

A system model of a signal communications system is as shown in FIG. 1. At a transmitting end, signal modulation is performed on primary data subjected to channel coding, so as to modulate the primary data into an audio signal of a data frame composed of a plurality of symbols and conduct digital-to-analogue conversion on the signal, and finally the signal is transmitted through a loud speaker. At a receiving end, a microphone after receiving the audio signal, reduces the audio signal to the primary data through analogue-to-digital conversion, signal demodulation and channel decoding.

Audio communications with a frequency below 24 kHz may make full use of present video and audio playing devices and receiving devices without specially customized loud speaker and microphone. However, in the natural world, an audio with a frequency below 24 kHz usually has very strong interference caused by environment noises.

SUMMARY

A technical problem to be solved by the present invention is to provide an acoustic channel-based data communications method. The present invention can implement audio signal communications in weak signal environment submerged in background noise.

In order to solve the foregoing technical problem, the present invention provides an acoustic channel-based data communications method, including:

performing channel coding on an original data signal using a CRC coding method and a BCH coding method to obtain a coded sequence;

modulating the coded sequence using a preset audio sequence symbol set via a symbol mapping method to obtain a digital audio signal;

selecting a channel frequency band according to characteristics of a transmitting equipment and interference between frequency bands; and converting the digital audio signal into an analog audio signal through a digital-to-analog converter and transmitting the signal to a channel for transmission according to the selected channel frequency band.

Further, the performing channel coding on the original data signal using a CRC coding method and a BCH coding method to obtain the coded sequence specifically includes:

coding the original data signal using the CRC coding method to obtain a CRC coded sequence; and coding the CRC coded sequence using the BCH coding method to obtain the coded sequence.

Further, the modulating the coded sequence using the preset audio sequence symbol set via a symbol mapping method to obtain the digital audio signal specifically includes:

selecting a sequence symbol as a synchronization symbol for a data frame of the digital audio signal;

selecting $2^{n+1}$ sequence symbols from the preset audio sequence symbol set and classifying the $2^{n+1}$ sequence symbols into odd mapping symbols and even mapping symbols, wherein the number of the odd mapping symbols is equal to that of the even mapping symbols, and n=1, 2, 3 . . . ;

dividing the coded sequence into a plurality of coded sequence groups, each coded sequence group comprising n bit data; and mapping the odd coded sequence group into a sequence symbol in the odd mapping symbol according to a preset mapping relation, and mapping the even coded sequence group into a sequence symbol in the even mapping symbol according to the preset mapping relation, thus mapping the coded sequences into a plurality of digital audio symbols;

wherein the synchronization symbol and the plurality of digital audio symbols form a data frame of the digital audio signal.

Further, the method, after mapping the coded sequence into a plurality of digital audio symbols, further includes:

copying partial data sequences of the digital audio symbols to a front end and a back end of the digital audio signal to form a front transition area and a back transition area, and completing symbol extension of the digital audio symbol;

wherein a gradient window function of the front transition area is $f(x)=\frac{1}{2}(\cos x+1)$, $x\in(\pi, 2\pi)$, a gradient window function of the back transition area is $f(x)=\frac{1}{2}(\cos x+1)$, $x\in(0, \pi)$, and the back transition area of a previous data frame and the front transition area of a later data frame of the digital audio signal are overlapped.

Further, the method, after completing symbol extension of the digital audio symbol, further includes:

for the digital audio symbol after the symbol extension, copying partial data sequences at the tail and inserting the partial data sequences between the front transition area and a head of the current digital audio symbol as guard interval, and performing further symbol extension on the digital audio data frame.

The present invention further provides an acoustic channel-based data communications method, including:

receiving an analog audio signal transmitted in a channel and converting the analog audio signal into a digital audio signal through an analog-to-digital converter;

eliminating strong interference channel frequency band data from the digital audio signal by calculating the cross-correlation between the digital audio signal having a frequency within the range of each channel frequency band and an original sample signal;

capturing a synchronization symbol by calculating the cross-correlation between a synchronization symbol sample and the digital audio signal with strong interference channel frequency band data eliminated, and performing symbol inverse mapping, thus completing signal demodulation and obtaining a digital sequence; and performing channel decoding on the digital sequence using a CRC decoding method and a BCH decoding method to obtain the original data signal.

Further, the eliminating strong interference channel frequency band data from the digital audio signal by calculating the cross-correlation between the digital audio signal having a frequency within the range of each channel frequency band and the original sample signal specifically includes:

dividing the channel into a plurality of channel frequency bands, respectively calculating the cross-correlation between the digital audio signal having a frequency within the range of each channel frequency band and the original sample signal, determining the channel frequency band with unobvious correlation peak as a strong interference channel frequency band, and eliminating the strong interference channel frequency band data from the digital audio signal, wherein a cross-correlation function is $r_{xy}$=IFFT{FFT{x(k)}*FFT{y(k)}'}; in the formula, x(k) is the digital audio signal, y(k) is the original sample signal, indicates conjugation, FFT indicates fast Fourier transform, and IFFT indicates inverse fast Fourier transform.

Further, the capturing a synchronization symbol by calculating the cross-correlation between the synchronization symbol sample and the digital audio signal with strong interference channel frequency band data eliminated, and performing symbol inverse mapping, thus completing signal demodulation and obtaining the digital sequence specifically includes:

for the digital audio signal with strong interference channel frequency band data eliminated, continuously calculating the cross-correlation between data in a detection window and the synchronization symbol sample; when obvious correlation peaks are not identified, sliding backward for a certain distance and capturing the synchronization symbol again; when obvious correlation peaks are identified, determining that frame synchronization is successful, and calculating the offset distance between the detection window and an original point according to the position of the correlation peak, adjusting the position of the detection window according to the offset distance between the detection window and the original point, and capturing the synchronization symbol; and performing correlation calculation on a sample sequence of odd/even mapping symbols and the digital symbol after the synchronization symbol in the digital audio signal in sequence according to an odd-even order, the most similar odd/even mapping symbol being a current symbol content, and mapping the current symbol content as the digital sequence according to a preset mapping relation, thus completing demodulation;

wherein the odd/even mapping symbol is obtained through the following steps: selecting $2^{n+1}$ sequence symbols from a preset audio sequence symbol set, and classifying the $2^{n+1}$ sequence symbols into odd mapping symbols and even mapping symbols, wherein the number of the odd mapping symbols is equal to that of the even mapping symbols, and n=1, 2, 3 . . . . .

Further, the performing channel decoding on the digital sequence using a CRC decoding method and a BCH decoding method to obtain the original data signal specifically includes:

decoding the digital sequence using the BCH decoding method; and decoding the BCH decoded signal using the CRC decoding method to obtain the original data signal.

The present invention further provides another acoustic channel-based data communications method, including:

performing channel coding on an original data signal using a CRC coding method and a BCH coding method to obtain a coded sequence;

modulating the coded sequence using a preset audio sequence symbol set by a symbol mapping method to obtain a digital audio signal;

selecting a channel frequency band according to characteristics of a transmitting equipment and interference between frequency bands;

converting the digital audio signal into an analog audio signal through a digital-to-analog converter, and transmitting the signal to a channel for transmission according to the selected channel frequency band;

receiving the analog audio signal transmitted in the channel and converting the signal into a digital audio signal through the analog-to-digital converter;

eliminating strong interference channel frequency band data from the digital audio signal by calculating the cross-correlation between the digital audio signal having a frequency within the range of each channel frequency band and an original sample signal;

capturing a synchronization symbol by calculating the cross-correlation between a synchronization symbol sample and the digital audio signal with strong interference channel frequency band data eliminated, and performing symbol inverse mapping, thus completing signal demodulation and obtaining a digital sequence; and performing channel decoding on the digital sequence using a CRC decoding method and a BCH decoding method to obtain the original data signal.

Further, the performing channel coding on the original data signal using a CRC coding method and a BCH coding method to obtain the coded sequence specifically includes:

coding the original data signal using the CRC coding method to obtain a CRC coded sequence; and coding the CRC coded sequence using the BCH coding method to obtain the coded sequence; and the performing channel decoding on the digital sequence using a BCH decoding method and a CRC decoding method to obtain the original data signal specifically includes:

decoding the digital sequence using the BCH decoding method; and decoding the BCH decoded signal using the CRC decoding method to obtain the data audio signal.

Further, the modulating the coded sequence using the preset audio sequence symbol set via a symbol mapping method to obtain the digital audio signal specifically includes:

selecting a sequence symbol as a synchronization symbol for a data frame of the digital audio signal;

selecting $2^{n+1}$ sequence symbols from the preset audio sequence symbol set and classifying the $2^{n+1}$ sequence symbols into odd mapping symbols and even mapping symbols, wherein the number of the odd mapping symbols is equal to that of the even mapping symbols, and n=1, 2, 3;

dividing the coded sequence into a plurality of coded sequence groups, each coded sequence group comprising n bit data; and mapping the odd coded sequence group into a sequence symbol in the odd mapping symbol according to a preset mapping relation, and mapping the even coded sequence group into a sequence symbol in the even mapping symbol according to preset mapping relation, thus mapping the coded sequence into a plurality of digital audio symbols;

wherein the synchronization symbol and the plurality of digital audio symbols form a data frame of the digital audio signal.

Further, the method, after mapping the coded sequence into a plurality of digital audio symbols, further includes:

copying partial data sequences of the digital audio symbols to a front end and a back end of the digital audio signal, to form a front transition area and a back transition area, and completing symbol extension of the digital audio symbol;

wherein a gradient window function of the front transition area is $f(x)=\frac{1}{2}(\cos x+1)$, $x\in(\pi, 2\pi)$, a gradient window function of the back transition area is $f(x)=\frac{1}{2}(\cos x+1)$, $x\in(0,$ π), and the back transition area of a previous data frame and the front transition area of a later data frame of the digital audio signal are overlapped.

Further, the method, after completing symbol extension of the digital audio symbol, further includes:

for the digital audio symbol after the symbol extension, copying partial data sequences at the tail and inserting the partial data sequences between the front transition area and a head of current digital audio symbol as guard interval, and performing further symbol extension on the digital audio data frame.

Further, the eliminating strong interference channel frequency band data from the digital audio signal by calculating the cross-correlation between the digital audio signal having a frequency within the range of each channel frequency band and the original sample signal specifically includes:

dividing the channel into a plurality of channel frequency bands, respectively calculating the cross-correlation between the digital audio signal having a frequency within the range of each channel frequency band and the original sample signal, determining the channel frequency band with unobvious correlation peak as a strong interference channel frequency band, and eliminating the strong interference channel frequency band data from the digital audio signal, wherein a cross-correlation function is $r_{xy}=\mathrm{IFFT}\{\mathrm{FFT}\{x(k)\}*\mathrm{FFT}\{y(k)\}'\}$; in the formula, x(k) is the digital audio signal, y(k) is the original sample signal, indicates conjugation, FFT indicates fast Fourier transform, and IFFT indicates inverse fast Fourier transform.

Further, the capturing a synchronization symbol by calculating the cross-correlation between the synchronization symbol sample and the digital audio signal with strong interference channel frequency band data eliminated, and performing symbol inverse mapping, thus completing signal demodulation and obtaining the digital sequence specifically includes:

for the digital audio signal with strong interference channel frequency band data eliminated, continuously calculating the cross-correlation between data in a detection window and the synchronization symbol sample; when obvious correlation peaks are not identified, sliding backward for a certain distance and capturing the synchronization symbol again; when obvious correlation peaks are identified, determining that frame synchronization is successful, and calculating the offset distance between the detection window and the original point according to the position of the correlation peak, adjusting the position of the detection window according to the offset distance between the detection window and the original point, and capturing the synchronization symbol; and performing correlation calculation on a sample sequence of odd/even mapping symbols and the digital symbol behind the synchronization symbol in the digital audio signal in sequence according to an odd-even order, the most similar odd/even mapping symbol being the current symbol content, and mapping the current symbol content as the digital sequence according to a preset mapping relation, thus completing demodulation.

Implementing the present invention has the following advantageous effects that: the present invention can implement communications in weak signal is environment submerged in background noise.

BRIEF DESCRIPTION OF THE DRAWINGS

In order to explain the technical solutions in the embodiments of the invention or in the related art more clearly, the drawings used in the descriptions of the embodiments or the related art will be simply introduced hereinafter. It is apparent that the drawings described hereinafter are merely some embodiments of the invention, and those skilled in the art may also obtain other drawings according to these drawings without going through creative work.

DETAILED DESCRIPTION

Further illustrative explanations will be made clearly and completely to the technical solutions in the embodiments of the invention hereinafter with reference to the accompanying drawings in the embodiments of the invention. Apparently, the embodiments described are merely partial embodiments of the present invention, rather than all embodiments. Other embodiments derive by those having ordinary skills in the art on the basis of the embodiments of the invention without going through creative efforts shall all fall within the protection scope of the present invention.

Figure 1:
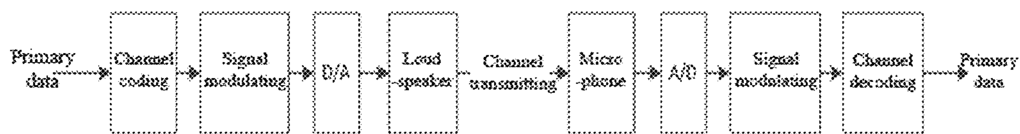
FIG. 1 is a block diagram of a signal communications system in the related art.
Figure 2:
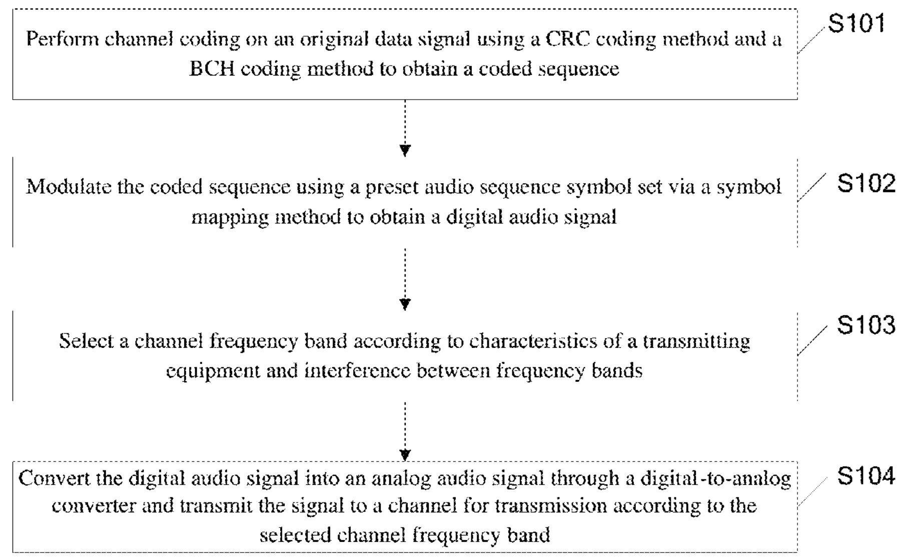
FIG. 2 is a flow block diagram of an embodiment of an acoustic channel-based data communications method provided by the present invention.

FIG. 2 is a flow block diagram of an embodiment of an acoustic channel-based data communications method provided by the present invention. The embodiment is described on the basis of data. As shown in FIG. 2, the embodiment includes the following steps.

In step S101, channel coding is performed on an original data signal using a CRC coding method and a BCH coding method to obtain a coded sequence.

When transmitting a digital signal, error code is produced during transmitting a data stream due to various reasons. By performing corresponding processing on the digital code stream via the link of channel coding, a system has a certain error correcting capability and anti-jamming capability, which can greatly avoid error code during transmitting a digital code stream; moreover, the data correctness and integrity can be verified.

To be specific, the step S101 includes the following steps.

In step S1011, the original data signal is coded using the CRC coding method to obtain a CRC coded sequence.

Wherein, the original data signal is any binary data. CRC, i.e., cyclic redundancy check code (Cyclic Redundancy Check) is an error correction code that is most commonly used in the field of data communications, which is characterized in that the lengths of an information field and a check field can be selected at random. The cyclic redundancy check (CRC) is a data transmission error detection function, which performs polynomial calculation on data, and attaches a result obtained behind a frame, through which a receiving equipment may verify whether the data received is wrong.

Figure 3:
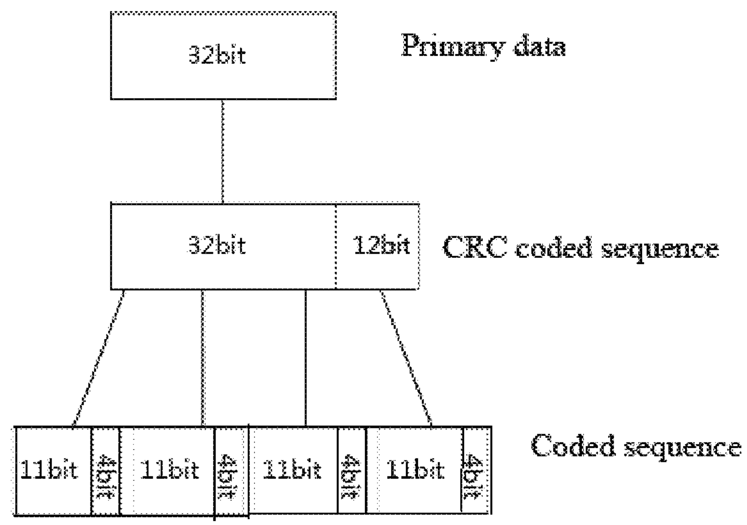
FIG. 3 is a block diagram of CRC coding and BCH coding.

Referring to FIG. 3, given that each frame transmits 32 bit primary data, the primary data is extended into 44 bit (32 bit primary data+12 bitCRC) according to CRC12 coding, i.e., the CRC coded sequence is 44 bit.

In step S1012, the CRC coded sequence is coded using the BCH coding method to obtain the coded sequence.

BCH coding is derived from the abbreviation of Bose, ray-Chaudhuri and Hocquenghem, which is a coding method for multistage, cycle, error correction and variable-length digital coding, and is a cyclic linear block code. Error occurred during transmission is corrected through the BCH coding.

The BCH coding divides a primary data sequence into message groups with each group including stationary k bits, and then independently transforms each message group into a binary digit group having a length of n(n>k), which is called as codeword, wherein a check fit r=n−k, and is recorded as bch(n,k). If the number of the message groups is M (apparently, M>=2), the totality of M codewards obtained in this way are called as a block code having a code length of n and an information number of M. The process of transforming the message groups into the codewords is called as coding, and an inverse process thereof is called as decoding.

Referring to FIG. 3, the CRC coded sequence is divided into four groups, each group including 11 bit. After BCH (15,11) coding, 60 bit data is obtained. That is, the coded sequence is 60 bit.

In step S102, the coded sequence is modulated using a preset audio sequence symbol set via a symbol mapping method to obtain a digital audio signal.

To be specific, the step S102 specifically includes the following steps.

In step S1021, a sequence symbol is selected from a preset audio sequence symbol set as a synchronization symbol for a data frame of the digital audio signal.

The obtaining the preset audio sequence symbol set employs the following steps: performing audio sampling on the preset symbols to obtain a time sequence, and selecting a plurality of groups from the time sequence as audio sequence symbols using a symbol selection criteria. To be specific, the symbol selection criteria is as follows: power on each frequency complies with equal-loudness contours of a human ear, so as to ensure that the human ear senses the same loudness at each frequency; it is relatively flat on time domains without dramatic fluctuations; and the cross-correlation between each audio sequence symbol is extremely weak.

In step S1022, $2^{n+1}$ sequence symbols are selected from the preset audio sequence symbol set, and the $2^{n+1}$ sequence symbols are classified into odd mapping symbols and even mapping symbols, wherein the number of the odd mapping symbols is equal to that of the even mapping symbols, and n=1, 2, 3 . . . .

When n=1, four sequence symbols are selected from the preset audio sequence symbol set, and two of the four sequence symbols are divided into odd mapping symbols and the other two are divided into even mapping symbols. When n=2, eight sequence symbols are selected from the preset audio sequence symbol set, and four of the eight sequence symbols are classified as odd mapping symbols and the other four are classified as even mapping symbols; for example, given that n=2, and the eight sequence symbols are respectively represented by A, B, C, D, E, F, G and H, A, B, C and D are classified as odd mapping symbols, while E, F, G and H are classified as even mapping symbols.

In step S1023, the coded sequence is divided into a plurality of coded sequence groups, each coded sequence group including n bit data.

Given that the coded sequence is 00010110 . . . , then the coding sequences may be divided into a plurality of sequence groups like 00, 01, 01, 10 . . . , each sequence group including 2 bit data.

In step S1024, the odd coded sequence group is mapped into a sequence symbol in the odd mapping symbol according to a preset mapping relation, and the even coded sequence group is mapped into a sequence symbol in the even mapping symbol according to the preset mapping relation, thus mapping the coded sequences into a plurality of digital audio symbols.

Figure 4:
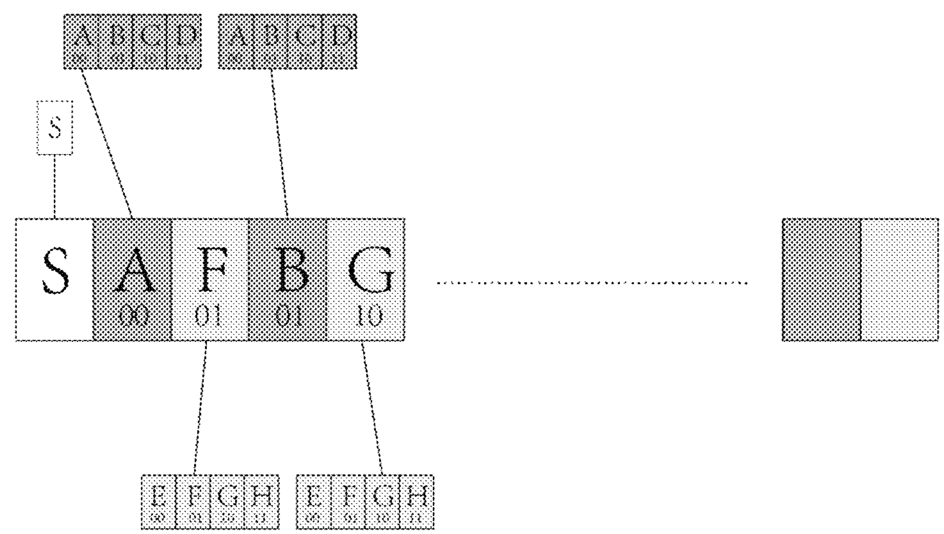
FIG. 4 is a block diagram of a signal mapping process.

Given that the mapping relation is: odd mapping symbols A/B/C/D represent data 00/01/10/11, and even mapping symbols E/F/G/H represent data 00/01/10/11, then the coded sequence group ranking 1 is 00, wherein 1 is an odd number, and an odd mapping symbol corresponding to the 00 coded sequence group is A; therefore, the 00 coded sequence group is mapped into the symbol A; the coded sequence group ranking 2 is 01, wherein 2 is an even number, and an even mapping symbols corresponding to the 01 coded sequence group is F; therefore, the 00 coded sequence group is mapped into the symbol F. Referring to FIG. 4 and by this analogy, the coded sequence groups are completely mapped, thus obtaining a data frame of the digital audio signal, wherein S represents a synchronization symbol. Wherein, the synchronization symbol and the plurality of digital audio symbols form a data frame of the digital audio signal.

Optionally, the step S102, after the step S1024, may further include step S1025 and step S1026.

In step S1025, partial data sequences of the digital audio symbols are copied to a front end and a back end of the digital audio signal to form a front transition area and a back transition area, and symbol extension of the digital audio symbol is completed;

wherein a gradient window function of the front transition area is $f(x)=\frac{1}{2}(\cos x+1)$, $x\epsilon(\pi, 2\pi)$, a gradient window function of the back transition area is $f(x)=\frac{1}{2}(\cos x+1)$, $x\epsilon(0, \pi)$, and the back transition area of a previous data frame and the front transition area of a later data frame of the digital audio signal are overlapped.

Figure 5:
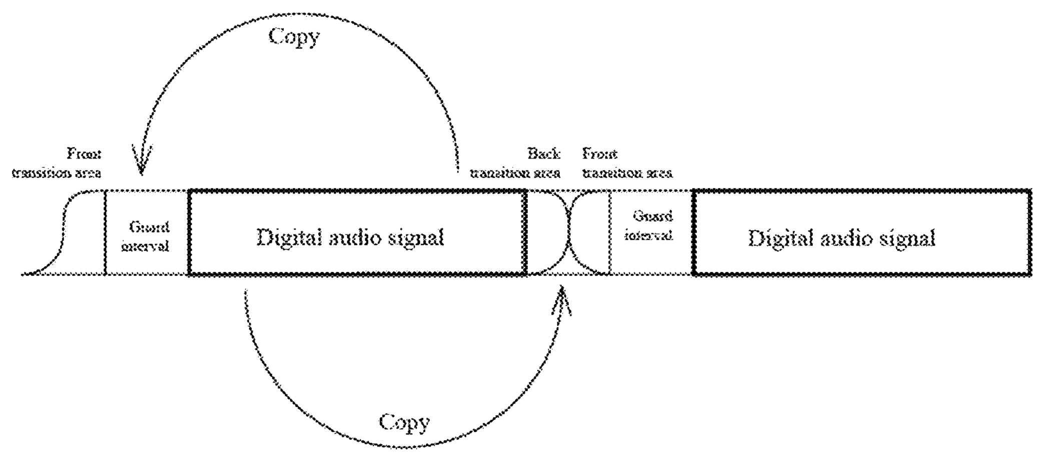
FIG. 5 is a block diagram of symbol extension.

Wherein, in order to ensure that energy when switching two symbols is not leak to other frequencies (reducing noise), partial original signal extension needs to be copied as a transition area. In order to improve the synchronization capturing success rate and reduce signal distortion caused by multipath interference, partial signal at the tail of the original signal may be copied between the front transition area and the original signal as guard interval. Refer to FIG. 5 for details.

In step S1026, for the digital audio symbol after the symbol extension, partial data sequences at the tail are copied and inserted between the front transition area and a head of the current digital audio symbol as guard interval, and further symbol extension is performed on the digital audio data frame.

Figure 6:
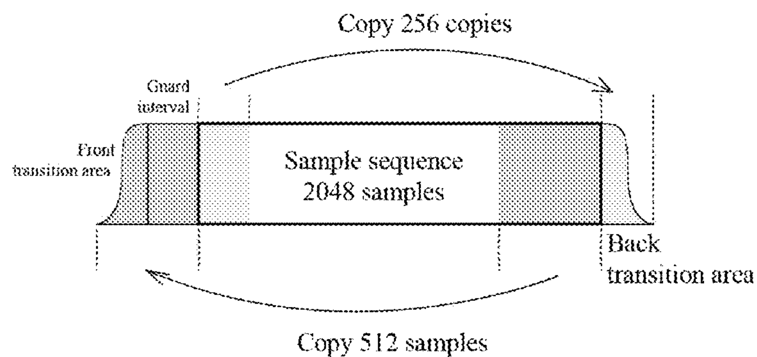
FIG. 6 is a block diagram illustrating the symbol extension.

Given that 2048 sampling points are served as a sample sequence length of one symbol, and the length from the guard interval and the transition area is ⅛ of the sample sequence length; 256 samples on the head of the digital audio signal of the sequence having 2048 points are copied to the tail and added with a cosine window as the back transition area, the 512 samples in the tail are copied to the head and a cosine window is added in the front 256 samples of the head as the front transition area, and the last 256 samples are served as the guard interval; and the back transition area of a previous symbol and the front transition area of a later symbol are overlapped. Refer to FIG. 6 for details.

In S103, a channel frequency band is selected according to characteristics of a transmitting equipment and interference between frequency bands.

Before the AD conversion of the transmitting end, channel frequency band may be selected for a transmitted signal in view of the characteristics and using requirements of the transmitting equipment; that is, quietness is performed on channels at some frequencies, and signals are transmitted only in the channel with a specific frequency. Selecting the channel frequency band mainly focuses on: ① the transmit power of the transmitting equipment is limited; the more the channel frequency bands are divided, the smaller the power averaged to each channel will be, and the power needs to be concentrated to a channel with small interference; ② a band width for transmitting the modulated data audio signal is limited, the fewer the frequency bands are, the smaller the band width will be required. Therefore, the transmitting end gives priority to the frequency band (above 16 khz) that cannot be perceived by a human ear, and then considers the frequency bands with less interference.

In step S104, the digital audio signal is converted into an analog audio signal through a digital-to-analog converter and transmitted to a channel for transmission according to the selected channel frequency band.

Figure 7:
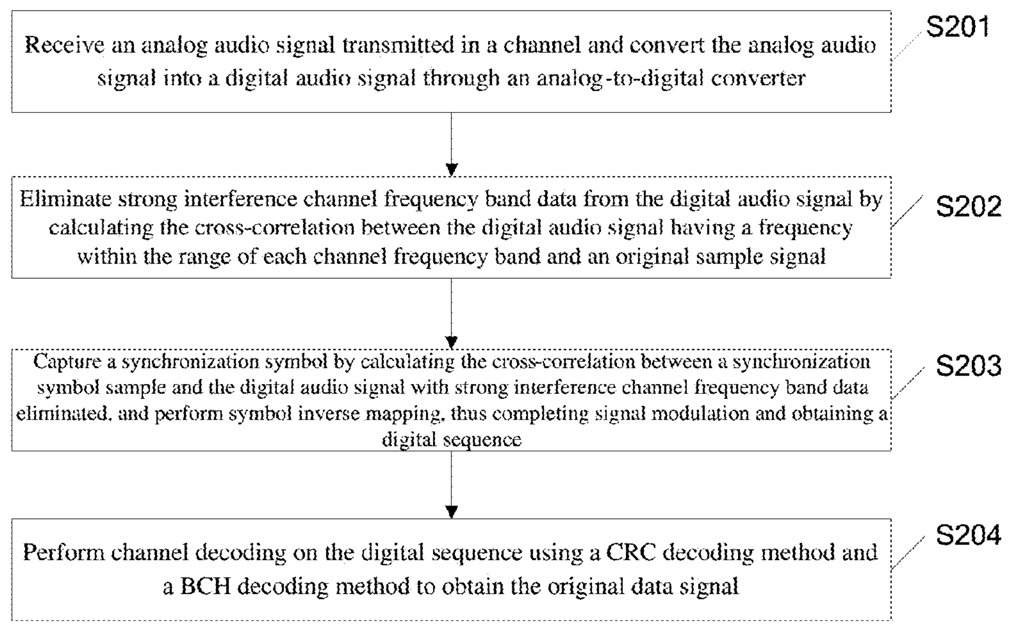
FIG. 7 is a flow block diagram of another embodiment of the acoustic channel-based data communications method provided by the present invention.

FIG. 7 is a flow block diagram of another embodiment of the acoustic channel-based data communications method provided by the present invention. The embodiment is described with respect to one signal receiving end, which is as shown in FIG. 7, including:

In step S201, the analog audio signal transmitted in the channel is received and converted into a digital audio signal through the analog-to-digital converter.

In step S202, strong interference channel frequency band data is eliminated from the digital audio signal by calculating the cross-correlation between the digital audio signal having a frequency within the range of each channel frequency band and an original sample signal.

To be specific, the step S202 includes the following steps.

The channel is divided into a plurality of channel frequency bands, the cross-correlation between the digital audio signal having a frequency within the range of each channel frequency band and the original sample signal is calculated respectively, the channel frequency band with unobvious correlation peak is determined as a strong interference channel frequency band, and the strong interference channel frequency band data is eliminated from the digital audio signal.

Wherein, a calculation formula of a cross-correlation function is $r_{xy}$=IFFT{FFT{x(k)}*FFT{y(k)}'}; in the formula, x(k) is the digital audio signal, y(k) is the original sample signal, indicates conjugation, FFT indicates fast Fourier transform, and IFFT indicates inverse fast Fourier transform.

Wherein, signals on some frequencies are difficult to recognize due to transmission process loss, phonation device attenuation and environment noise interference; therefore, it needs to select the channel during the actual demodulating process. A specific principle is as follows: 0-24 kHz are divided into a plurality of channels; when calculating the correlation, correlation calculation is respectively performed on the frequencies within the range of each channel frequency band (set the FFT results of other channels as zero), the correlation peaks of the interfered channel frequency bands are not obvious relative to other channels, and interference channel frequency band data can be eliminated.

In step S203, a synchronization symbol is captured by calculating the cross-correlation between a synchronization symbol sample and the digital audio signal with strong interference channel frequency band data eliminated, and symbol inverse mapping is performed, thus completing signal demodulation and obtaining a digital sequence.

In step S2031, for the digital audio signal with strong interference channel frequency band data eliminated, the cross-correlation between data in a detection window and the synchronization symbol sample is continuously calculated; when obvious correlation peaks are not identified, sliding back for a certain distance is performed and the synchronization symbol is captured again; when obvious correlation peaks are identified, that frame synchronization is determined to be successful, and the offset distance between the detection window and an original point is calculated according to the position of the correlation peak, the position of the detection window is adjusted according to the offset distance between the detection window and the original point, and the synchronization symbol is captured.

Figure 8:
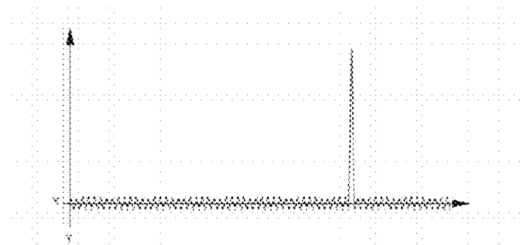
FIG. 8 is a diagram of a correlation function when a received signal is similar to an original signal sample.
Figure 9:
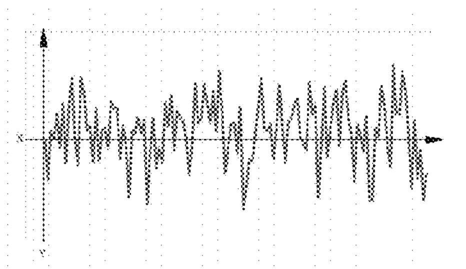
FIG. 9 is a diagram of a correlation function when the received signal is irrelevant to the original signal sample.

Wherein, when the received signal is similar to the sample, the image of the correlation function is as shown in FIG. 8, wherein the position of the correlation peak is the offset distance between the detection window and the original point. When the received signal is irrelevant to the sample, the image of the correlation function is as shown in FIG. 9; therefore, the currently received signal can be determined whether to include the contents of the current symbol sample by just recognizing the correlation peak of the correlation function.

When no obvious correlation peaks are recognized through the image of the correlation function, then the current window does not include or include few sample sequences of the synchronization symbol, or the current signal interference is too strong, and it needs to slide back for a certain distance and then perform synchronization capturing again; when obvious correlation peaks are recognized through the image of the correlation function, i.e., the current detection window includes the sample sequences of the synchronization symbol, and the frame synchronization is successful, then the offset distance between the detection window and the original point can be calculated according to the position of the correlation peak, and the position of the detection window is adjusted according to this offset so as to conduct symbol synchronization.

In step S2032, correlation calculation is performed on a sample sequence of odd/even mapping symbols and the digital symbol after the synchronization symbol in the digital audio signal in sequence according to an odd-even order, the most similar odd/even mapping symbol being a current symbol content, and mapping the current symbol content as the digital sequence according to a preset mapping relation, thus completing demodulation.

Wherein, the odd/even mapping symbol is obtained through the following steps: selecting $2^{n+1}$ sequence symbols from the preset audio sequence symbol set and classifying the $2^{n+1}$ sequence symbols into odd mapping symbols and even mapping symbols, wherein the number of the odd mapping symbols is equal to that of the even mapping symbols, and n=1, 2, 3 . . . .

In step S204, channel decoding is performed on the digital sequence using a CRC decoding method and a BCH decoding method to obtain the original data signal.

To be specific, the step S204 specifically includes the following steps.

In step S2041, the digital sequence is decoded using the BCH decoding method; and in step S2042, the BCH decoded signal is decoded using the CRC decoding method to obtain the original data signal.

Figure 10:
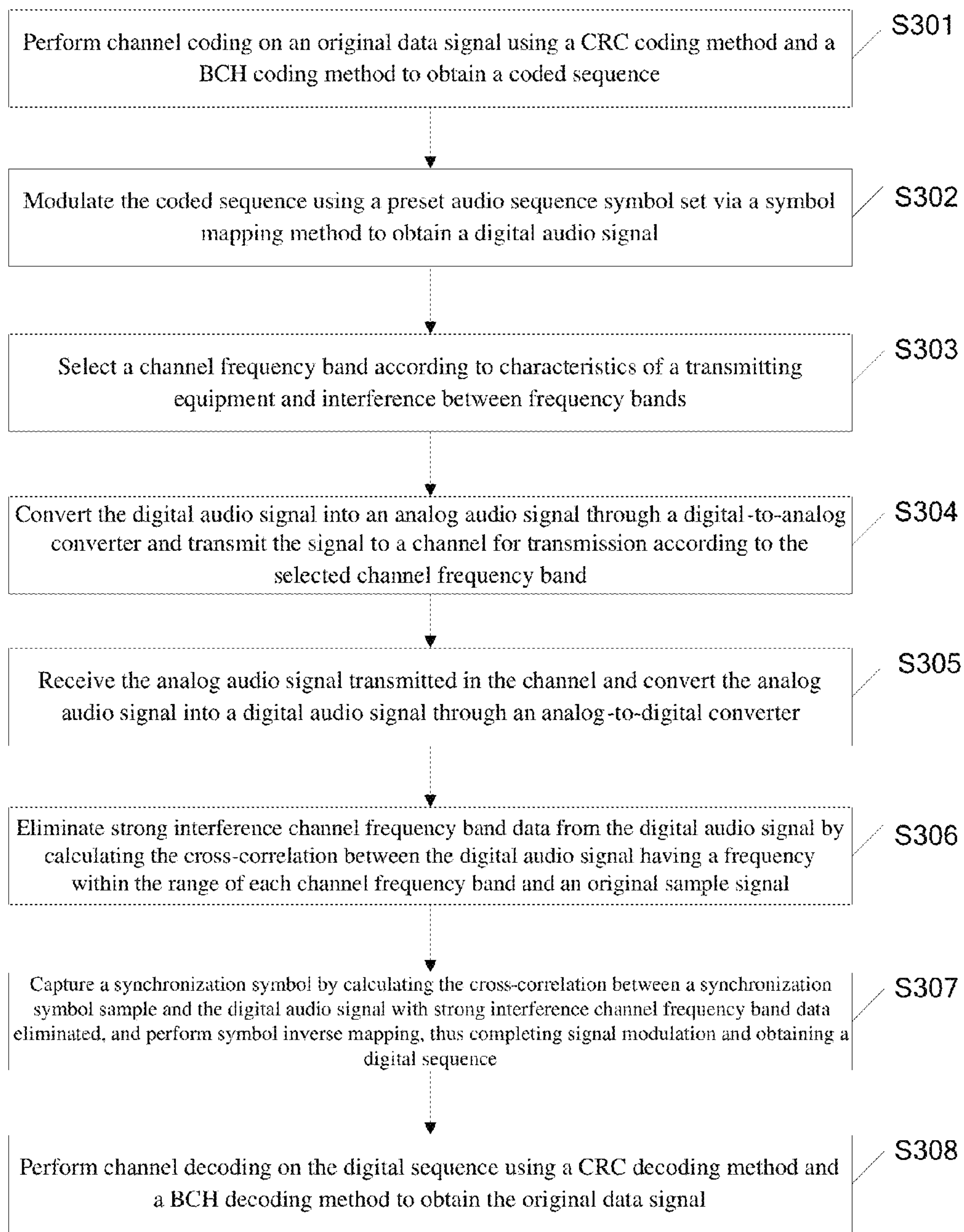
FIG. 10 is a flow block diagram of one another embodiment of the acoustic channel-based data communications method provided by the present invention.

FIG. 10 is a flow block diagram of one another embodiment of the acoustic channel-based data communications method provided by the present invention, including the following steps.

In step S301, channel coding is performed on an original data signal using a CRC coding method and a BCH coding method to obtain a coded sequence.

When transmitting a digital signal, error code is produced during transmitting a data stream due to various reasons. By performing corresponding processing on the digital code stream via the link of channel coding, a system has a certain error correcting capability and anti-jamming capability, which can greatly avoid error code during transmitting a digital code stream; moreover, the data correctness and integrity can be verified.

To be specific, the step S301 includes the following steps.

In step S3011, the original data signal is coded using the CRC coding method to obtain a CRC coded sequence.

Wherein, the original data signal is any binary data. CRC, i.e., cyclic redundancy check code (Cyclic Redundancy Check) is an error correction code that is most commonly used in the field of data communications, which is characterized in that the lengths of an information field and a check field can be selected at random. The cyclic redundancy check (CRC) is a data transmission error detection function, which performs polynomial calculation on data, and attaches a result obtained behind a frame, through which a receiving equipment may verify whether the data received is correct.

Referring to FIG. 3, given that each frame transmits 32 bit primary data, the primary data is extended into 44 bit (32 bit primary data+12 bitCRC) according to CRC12 coding, i.e., the CRC coded sequence is 44 bit.

In step S3012, the CRC coded sequence is coded using the BCH coding method to obtain the coded sequence.

BCH coding is derived from the abbreviation of Bose, ray-Chaudhuri and Hocquenghem, which is a coding method for multistage, cycle, error correction and variable-length digital coding, and is a cyclic linear block code. Error occurred during transmission is corrected through the BCH coding.

The BCH coding divides a primary data sequence into message groups with each group including stationary k bits, and then independently transforms each message group into a binary digit group having a length of n(n>k), which is called as codeword, wherein a check fit r=n−k, and is recorded as bch(n,k). If the number of the message groups is M (apparently, M>=2), the totality of M codewords obtained in this way are called as a block code having a code length of n and an information number of M. The process of transforming the message groups into the codewords is called as coding, and an inverse process thereof is called as decoding.

Referring to FIG. 3, the CRC coded sequence is divided into four groups, each group including 11 bit. After BCH (15,11) coding, 60 bit data is obtained. That is, the coded sequence is 60 bit.

In step S302, the coded sequence is modulated using a preset audio sequence symbol set via a symbol mapping method to obtain a digital audio signal.

To be specific, the step S302 specifically includes the following steps.

In step S3021, a sequence symbol is selected from a preset audio sequence symbol set as a synchronization symbol for a data frame of the digital audio signal.

The obtaining the preset audio sequence symbol set employs the following steps: performing audio sampling on the preset symbols to obtain a time sequence, and selecting a plurality of groups from the time sequence as audio sequence symbols using a symbol selection criteria. To be specific, the symbol selection criteria is as follows: power on each frequency complies with equal-loudness contours of a human ear, so as to ensure that the human ear senses the same loudness at each frequency. it is relatively flat on time domains without dramatic fluctuations; and the cross-correlation between each audio sequence symbol is extremely weak.

In step S3022, $2^{n+1}$ sequence symbols are selected from the preset audio sequence symbol set and the $2^{n+1}$ sequence symbols are classified into odd mapping symbols and even mapping symbols, wherein the number of the odd mapping symbols is equal to that of the even mapping symbols, and n=1, 2, 3 . . . .

When n=1, four sequence symbols are selected from the preset audio sequence symbol set, and two of the four sequence symbols are divided into odd mapping symbols and the other two are divided into even mapping symbols. When n=2, eight sequence symbols are selected from the preset audio sequence symbol set, and four of the eight sequence symbols are classified as odd mapping symbols and the other four are classified as even mapping symbols; for example, given that n=2, and the eight sequence symbols are respectively represented by A, B, C, D, E, F, G and H, A, B, C and D are classified as odd mapping symbols, while E, F, G and H are classified as even mapping symbols.

In step S3023, the coded sequence is divided into a plurality of coded sequence groups, each coded sequence group including n bit data.

Given that the coded sequence is 00010110 . . . , then the coding sequences may be divided into a plurality of sequence groups like 00, 01, 01, 10 . . . , each sequence group including 2 bit data.

In step S3024, the odd coded sequence group is mapped into a sequence symbol in the odd mapping symbol according to a preset mapping relation, and the even coded sequence group is mapped into a sequence symbol in the even mapping symbol according to the preset mapping relation, thus mapping the coded sequences into a plurality of digital audio symbols.

Given that the mapping relation is: odd mapping symbols A/B/C/D represent data 00/01/10/11, and even mapping symbols E/F/G/H represent data 00/01/10/11, then the coded sequence group ranking 1 is 00, wherein 1 is an odd number, and an odd mapping symbol corresponding to the 00 coded sequence group is A; therefore, the 00 coded sequence group is mapped into the symbol A; the coded sequence group ranking 2 is 01, wherein 2 is an even number, and an even mapping symbols corresponding to the 01 coded sequence group is F; therefore, the 00 coded sequence group is mapped into the symbol F. Referring to FIG. 4 and by this analogy, the coded sequence groups are completely mapped, thus obtaining a data frame of the digital audio signal, wherein S represents a synchronization symbol. Wherein, the synchronization symbol and the plurality of digital audio symbols form a data frame of the digital audio signal.

Optionally, the step S302, after the step S3024, may further include step S3025 and step S3026.

In step S3025, partial data sequences of the digital audio symbols are copied to a front end and a back end of the digital audio signal to form a front transition area and a back transition area, and symbol extension of the digital audio symbol is completed;

wherein a gradient window function of the front transition area is $f(x)=\frac{1}{2}(\cos x+1)$, $x\in(\pi, 2\pi)$, a gradient window function of the back transition area is $f(x)=\frac{1}{2}(\cos x+1)$, $x\in(0, \pi)$, and the back transition area of a previous data frame and the front transition area of a later data frame of the digital audio signal are overlapped.

Wherein, in order to ensure that energy when switching two symbols is not leak to other frequencies (reducing noise), partial original signal extension needs to be copied as a transition area. In order to improve the synchronization capturing success rate and reduce signal distortion caused by multipath interference, partial signal at the tail of the original signal may be copied between the front transition area and the original signal as guard interval. Refer to FIG. 5 for details.

In step S3026, for the digital audio symbol after the symbol extension, partial data sequences at the tail are copied and inserted between the front transition area and a head of the current digital audio symbol as guard interval, and further symbol extension is performed on the digital audio data frame.

Given that 2048 sampling points are served as a sample sequence length of one symbol, and the length from the guard interval and the transition area is ⅛ of the sample sequence length; 256 samples on the head of the digital audio signal of the sequence having 2048 points are copied to the tail and added with a cosine window as the back transition area, the 512 samples in the tail are copied to the head and a cosine window is added in the front 256 samples of the head as the front transition area, and the last 256 samples are served as the guard interval; and the back transition area of a previous symbol and the front transition area of a later symbol are overlapped. Refer to FIG. 6 for details.

In S303, a channel frequency band is selected according to characteristics of a transmitting equipment and interference between frequency bands.

Before the AD conversion of the transmitting end, channel frequency band may be selected for a transmitted signal in view of the characteristics and using requirements of the transmitting equipment; that is, quietness is performed on channels at some frequencies, and signals are transmitted only in the channel with a specific frequency. Selecting the channel frequency band mainly focuses on: ① the transmit power of the transmitting equipment is limited; the more the channel frequency bands are divided, the smaller the power averaged to each channel will be, and the power needs to be concentrated to a channel with small interference; ② a band width for transmitting the modulated data audio signal is limited, the fewer the frequency bands are, the smaller the band width will be required. Therefore, the transmitting end gives priority to the frequency band (above 16 khz) that cannot be perceived by a human ear, and then considers the frequency bands with less interference.

In step S304, the digital audio signal is converted into an analog audio signal through a digital-to-analog converter and transmitted to a channel for transmission according to the selected channel frequency band.

In step S305, the analog audio signal transmitted in the channel is received and converted into a digital audio signal through the analog-to-digital converter.

In step S306, strong interference channel frequency band data is eliminated from the digital audio signal by calculating the cross-correlation between the digital audio signal having a frequency within the range of each channel frequency band and an original sample signal.

To be specific, the step S306 includes the following steps.

The channel is divided into a plurality of channel frequency bands, the cross-correlation between the digital audio signal having a frequency within the range of each channel frequency band and the original sample signal is calculated respectively, the channel frequency band with unobvious correlation peak is determined as a strong interference channel frequency band, and the strong interference channel frequency band data is eliminated from the digital audio signal.

Wherein, a calculation formula of a cross-correlation function is $r_{xy}=IFFT\{FFT\{x(k)\}*FFT\{y(k)\}'\}$; in the formula, x(k) is the digital audio signal, y(k) is the original sample signal, indicates conjugation, FFT indicates fast Fourier transform, and IFFT indicates inverse fast Fourier transform.

Wherein, signals on some frequencies are difficult to recognize due to transmission process loss, phonation device attenuation and environment noise interference; therefore, it needs to select the channel during the actual demodulating process. A specific principle is as follows: 0-24 kHz are divided into a plurality of channels; when calculating the correlation, correlation calculation is respectively performed on the frequencies within the range of each channel frequency band (set the FFT results of other channels as zero), the correlation peaks of the interfered channel frequency bands are not obvious relative to other channels, and interference channel frequency band data can be eliminated.

In step S307, a synchronization symbol is captured by calculating the cross-correlation between a synchronization symbol sample and the digital audio signal with strong interference channel frequency band data eliminated, and symbol inverse mapping is performed, thus completing signal demodulation and obtaining a digital sequence.

In step S3071, for the digital audio signal with strong interference channel frequency band data eliminated, the cross-correlation between data in a detection window and the synchronization symbol sample is continuously calculated; when obvious correlation peaks are not identified, sliding back for a certain distance is performed and the synchronization symbol is captured again; when obvious correlation peaks are identified, that frame synchronization is determined to be successful, and the offset distance between the detection window and an original point is calculated according to the position of the correlation peak, the position of the detection window is adjusted according to the offset distance between the detection window and the original point, and the synchronization symbol is captured.

Wherein, when the received signal is similar to the sample, the image of the correlation function is as shown in FIG. 8, wherein the position of the correlation peak is the offset distance between the detection window and the original point. When the received signal is irrelevant to the sample, the image of the correlation function is as shown in FIG. 9; therefore, the currently received signal can be determined whether to include the contents of the current symbol sample by recognizing the correlation peak of the correlation function.

When no obvious correlation peaks are recognized through the image of the correlation function, then the current window does not include or include few sample sequences of the synchronization symbol, or the current signal interference is too strong, and it needs to slide back for a certain distance and then perform synchronization capturing again; when obvious correlation peaks are recognized through the image of the correlation function, i.e., the current detection window includes the sample sequences of the synchronization symbol, and the frame synchronization is successful, then the offset distance between the detection window and the original point can be calculated according to the position of the correlation peak, and the position of the detection window is adjusted according to this offset so as to conduct symbol synchronization.

In step S3072, correlation calculation is performed on a sample sequence of odd/even mapping symbols and the digital symbol after the synchronization symbol in the digital audio signal in sequence according to an odd-even order, the most similar odd/even mapping symbol being a current symbol content, and mapping the current symbol content as the digital sequence according to a preset mapping relation, thus completing demodulation.

Wherein, the odd/even mapping symbol is obtained through the following steps: selecting $2^{n+1}$ sequence symbols from the preset audio sequence symbol set and classifying the $2^{n+1}$ sequence symbols into odd mapping symbols and even mapping symbols, wherein the number of the odd mapping symbols is equal to that of the even mapping symbols, and n=1, 2, 3 . . . .

In step 308, channel decoding is performed on the digital sequence using a CRC decoding method and a BCH decoding method to obtain the original data signal.

To be specific, the step S308 specifically includes the following steps.

In step S3081, the digital sequence is decoded using the BCH decoding method; and In step S3082, the BCH decoded signal is decoded using the CRC decoding method to obtain the original data signal.

Implementing the present invention has the following advantageous effects that: the present invention implements frame synchronization through the position of the correlation peaks during communications; and implement data frame synchronization through a method of inserting the synchronization symbol. Through a method of calculating the signal correlation and selectively eliminating strong interference channel frequency band, the present invention can implement communications in weak signal environment submerged in background noise.

It should be noted that, in the description herein, the terms "include", "comprise" and any variation thereof refer to "including but not limited to". Therefore, in the context of a process, method, object or device that includes a series of elements, the process, method, object or device not only includes such elements, but also includes other elements not specified expressly, or may include inherent elements of the process, method, object or device. Unless otherwise specified, in the context of "include a . . . ", the process, method, object or device that includes or comprises the specified elements may include other identical elements.

The number of the above embodiment is merely provided for description, but does not represent the strengths of the embodiments.

In the embodiments provided by the present application, it shall be appreciated that the disclosed system, device and method may be implemented in other ways. For example, the above device embodiments are just exemplary. For example, the unit division is just a logical function division, and other division mode may be used in the implementation, e.g., multiple units or components may be combined or integrated into another system, or some features may be omitted or not executed. Another point is that the displayed or discussed mutual coupling, direct coupling or communication connection may be implemented through indirect coupling or communication connection between some interfaces, devices or units in electrical, mechanical or other forms.

Persons skilled in the art may further realize that, in combination with the embodiments disclosed here, described units and algorithm steps of each example can be implemented with electronic hardware, computer software, or a combination thereof. In order to clearly describe the interchangeability between the hardware and the software, compositions and steps of each example have been generally described according to functions in the foregoing descriptions. Whether these functions are executed as hardware or software depends on particular applications and design constraint conditions of the technical solutions. Persons skilled in the art may use different methods to implement the described functions for each particular application, but the implementation should not be considered as going beyond the scope of the present invention.

In combination with the embodiments disclosed here, described steps of the method or algorithm may be directly implemented by using hardware, a software module executed by a processor, or a combination of the two. The software module may be placed in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

The above descriptions on the disclosed embodiments enable those skilled in the art can realize or use the present invention. Various modifications on these embodiments are apparent for those skilled in the art, and general principles defined herein can be realized in other embodiments without departing from the spirit or scope of the present invention. Accordingly, the present invention will not be limited to these embodiments shown herein, but is to be accorded with the widest scope consistent with the principles and novel features disclosed herein.

What is claimed is:

1. An acoustic channel-based data communications method comprises the following steps:

performing channel coding on an original data signal using a Cyclic Redundancy Check (CRC) coding method and a Bose-Chaudhuri-Hocquenghem (BCH) coding method to obtain a coded sequence;

modulating the coded sequence using a preset audio sequence symbol set via a symbol mapping method to obtain a digital audio signal;

selecting a channel frequency band according to characteristics of a transmitting equipment and interference between frequency bands; and converting the digital audio signal into an analog audio signal through a digital-to-analog converter and transmitting the signal to a channel for transmission according to the selected channel frequency band;

wherein the modulating the coded sequence using the preset audio sequence symbol set via a symbol mapping method to obtain the digital audio signal specifically comprises:

selecting a sequence symbol as a synchronization symbol for a data frame of the digital audio signal;

selecting $2^{n+1}$ sequence symbols from the preset audio sequence symbol set and classifying the $2^{n+1}$ sequence symbols into odd mapping symbols and even mapping symbols, wherein the number of the odd mapping symbols is equal to that of the even mapping symbols, and n=1, 2, 3 . . . ;

dividing the coded sequence into a plurality of coded sequence groups, each coded sequence group comprising n bit data; and mapping the odd coded sequence group into a sequence symbol in the odd mapping symbol according to a preset mapping relation, and mapping the even coded sequence group into a sequence symbol in the even mapping symbol according to the preset mapping relation, thus mapping the coded sequences into a plurality of digital audio symbols;

wherein the synchronization symbol and the plurality of digital audio symbols form a data frame of the digital audio signal.

2. The acoustic channel-based data communication method according to claim 1, wherein the performing channel coding on the original data signal using the CRC coding method and the BCH coding method to obtain the coded sequence specifically comprises:

coding the original data signal using the CRC coding method to obtain the CRC coded sequence; and coding the CRC coded sequence using the BCH coding method to obtain the coded sequence.

3. The acoustic channel-based data communication method according to claim 1, wherein the method, after mapping the coded sequence into a plurality of digital audio symbols, further comprises:

copying partial data sequences of the digital audio symbols to a front end and a back end of the digital audio signal to form a front transition area and a back transition area, and completing symbol extension of the digital audio symbol;

wherein a gradient window function of the front transition area is $f(x)=\frac{1}{2}(\cos x+1)$, $x\in(\pi, 2\pi)$, a gradient window function of the back transition area is $f(x)=\frac{1}{2}(\cos x+1)$, $x\in(0, \pi)$, and the back transition area of a previous data frame and the front transition area of a later data frame of the digital audio signal are overlapped.

4. The acoustic channel-based data communication method according to claim 3, wherein the method, after completing symbol extension of the digital audio symbol, further comprises:

for the digital audio symbol after the symbol extension, copying partial data sequences at the tail and inserting the partial data sequences between the front transition area and a head of the current digital audio symbol as guard interval, and performing further symbol extension on the digital audio data frame.

* * * * *

UNITED STATES PATENT AND TRADEMARK OFFICE

CERTIFICATE OF CORRECTION

PATENT NO. : 9,941,978 B2
APPLICATION NO. : 14/859342
DATED : April 10, 2018
INVENTOR(S) : Jinghong Chen, Xiangning Chen and Jingzhun Feng It is certified that error appears in the above-identified patent and that said Letters Patent is hereby corrected as shown below:

On the Title Page

(73) Assignee should read: JINGHONG CHEN (NANJING, CN)

Signed and Sealed this
Eleventh Day of June, 2019

Andrei Iancu
*Director of the United States Patent and Trademark Office*